US012462667B2

(12) United States Patent
Rosales et al.

(10) Patent No.: US 12,462,667 B2
(45) Date of Patent: Nov. 4, 2025

(54) ALARM PANEL COMMUNICATIONS SYSTEM

(71) Applicant: AMETEK, INC., Berwyn, PA (US)

(72) Inventors: Daniel Rosales, Kennesaw, GA (US); Gary Russo, Selden, NY (US); Sean Stewart, Atlanta, GA (US)

(73) Assignee: Ametek, Inc., Berwyn, PA (US)

( * ) Notice: Subject to any disclaimer, the term of this patent is extended or adjusted under 35 U.S.C. 154(b) by 0 days.

(21) Appl. No.: 18/392,804

(22) Filed: Dec. 21, 2023

(65) Prior Publication Data

US 2024/0221489 A1 Jul. 4, 2024

Related U.S. Application Data

(60) Provisional application No. 63/435,683, filed on Dec. 28, 2022.

(51) Int. Cl.
*G08B 25/00* (2006.01)

(52) U.S. Cl.
CPC .......... *G08B 25/00* (2013.01); *G08B 25/004* (2013.01); *G08B 25/007* (2013.01)

(58) Field of Classification Search
CPC ...... G08B 25/00; G08B 25/004; G08B 25/01; G08B 25/016; G10L 25/21; G09B 21/00
See application file for complete search history.

(56) References Cited

U.S. PATENT DOCUMENTS 9,870,719 B1 * 1/2018 Watkins .................. G10L 25/21
2017/0032659 A1 * 2/2017 Jordan ................ G08B 25/004

* cited by examiner

*Primary Examiner* — Van T Trieu
(74) *Attorney, Agent, or Firm* — Buchanan Ingersoll & Rooney PC

(57) ABSTRACT

A condition responsive indicating device, comprising a local transceiver, configured to communicate with a signal box alarm panel, and a processor, coupled to the local transceiver. The condition responsive indicating device also comprises a remote transceiver, coupled to the processor and configured to connect to at least one network as well as a memory, coupled to the processor. The condition responsive indicating device further comprises programming in the memory, wherein execution of the programming by the processor configures the condition responsive indicating device to implement the following functions. First, to receive an input message via the local transceiver, the input message including a protocol designator. Second, to select a protocol based on the protocol designator of the input message. Third, to transmit an output message via the remote transceiver, over at least one outbound network from the at least one network, utilizing the selected protocol.

20 Claims, 4 Drawing Sheets

ALARM PANEL COMMUNICATIONS SYSTEM

CROSS-REFERENCE TO RELATED APPLICATIONS

This application claims priority to U.S. Provisional Patent Application No. 63/435,683, filed on Dec. 28, 2022, titled "Alarm Panel Communications System", the entire disclosure of which is incorporated by reference herein.

FIELD OF THE INVENTION

The present invention relates generally to the field of condition responsive indicating devices, particularly security and life-safety systems, and the transmission of auxiliary data from an alarm panel connected to a security system toward networked auxiliary servers.

BACKGROUND OF THE INVENTION

Security systems, (or condition responsive indicting systems) are known in the art to notify personnel of when a triggering event is occurring at a site where the security system is established by sensing an alarm condition. Triggering events can include fires, floods, intrusions, power surges, or other events which may risk loss of life, or damage the site or property hosted at the site. Other triggering events can also include improperly working components, power outages and communication issues.

Conventionally, residential and commercial security systems report triggering events (including alarms) using telephone connection to the central station. Telephone connections were originally land lines. More recently, telephone connections involved cellular communication alone or in combination with a land line. In traditional installations, the event data is sent through a combination of pre-set codes (such as Security Industry Association (SIA) codes or Contact ID codes) and tones over the phone connection to a monitoring office. More recently, security systems support reporting of event data via a Local Area Network (LAN) or Wide Area Network (WAN) connected to a communication medium such as an Integrated Services Digital Network (ISDN) or broadband data interface. For example, an alarm panel may use a broadband connection (typically Ethernet) via the premises data network, or cellular connections to report alarms to the central station.

Security systems, in particular the systems and devices which transfer information from alarm panels to monitoring offices, are limited by protocols which define the structure and subject of the information transferred. The universe of SIA codes and Contact ID codes are relatively small, and cannot provide granular data. For example, the fact that a fire is occurring can be transmitted via SIA codes, but not the temperature history and particular locations of detected fire. This detailed information could be valuable and possibly critical to first responders responding to a fire alarm. Additionally, the transferring systems and devices are configured to only transfer information to monitoring offices, despite the fact that the broadband connection is capable of connecting to any number of devices connected to the broadband network. However, other organizations, such as the owners or operators of the alarm panel, may find detailed information useful for diagnostic or maintenance purposes. Alarm panels may also transmit non-emergency data, such as statuses, conditions, alerts, and received non-emergency data, such as software updates, without needing to contact an emergency-responsive monitoring office.

Changes in software capability do not always pair with existing hardware capability. Many contemporary alarm panels are only configured to communicate utilizing telephone connections, and even those alarm panels capable of serial communication do not implement networking functionality to communicate a non-telephone network.

Accordingly, a system for transmitting both traditional alarm codes, as well as non-code data, from alarm panels to either monitoring offices or other off-site offices using broadband is desired to overcome these and other limitations in the art.

SUMMARY OF THE INVENTION

In one exemplary embodiment, there is provided a condition responsive indicating device, comprising a local transceiver, configured to communicate with a signal box alarm panel, and a processor, coupled to the local transceiver. The condition responsive indicating device also comprises a remote transceiver, coupled to the processor and configured to connect to at least one network as well as a memory, coupled to the processor. The condition responsive indicating device further comprises programming in the memory, wherein execution of the programming by the processor configures the condition responsive indicating device to implement the following functions. First, the condition responsive indicating device receives an input message via the local transceiver, the input message including a protocol designator. Second, the condition responsive indicating device selects a protocol based on the protocol designator of the input message. Third, the condition responsive indicating device transmits an output message via the remote transceiver, over at least one outbound network from the at least one network, utilizing the selected protocol.

In another exemplary embodiment, there is provided a condition responsive indicating system comprising a signal box alarm panel and a condition responsive indicating device, coupled to the signal box alarm panel. The condition responsive indication device comprises a local transceiver configured to communicate with a signal box alarm panel, a processor coupled to the local transceiver, a remote transceiver coupled to the processor, and a memory coupled to the processor. The condition responsive indicating system also comprises a communication server coupled to the condition responsive indicating device via the remote transceiver, a monitoring server remote from and coupled to the communication server, and an auxiliary server, remote from and coupled to the condition responsive indicating device via the remote transceiver. The signal box alarm panel determines a condition has been satisfied. In response to the determination, the signal box alarm panel transmits an alarm command to the condition responsive indicating device. In response to receiving the transmission, the condition responsive indicating device transmits the alarm command to the communication server. The communication server transmits the alarm command to the monitoring server packaged according to the IP protocol or a public switched telephone network (PSTN) protocol. The signal box alarm panel transmits an auxiliary command to the condition responsive indicating device. The condition responsive indicating device transmits the auxiliary command to the auxiliary server according to the IP protocol.

In yet another exemplary embodiment, there is provided a condition responsive indicating system comprising a signal box alarm panel, and a monitoring server configured to receive communications over a packet-switched or circuit-switched communication means. The condition responsive indicating system is configured to transmit a message from the signal box alarm panel to the monitoring server.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Embodiments of inventions will now be described, strictly by way of example and not limitation, with reference to the accompanying figures, in which.

DETAILED DESCRIPTION OF THE INVENTION

Figure 1:
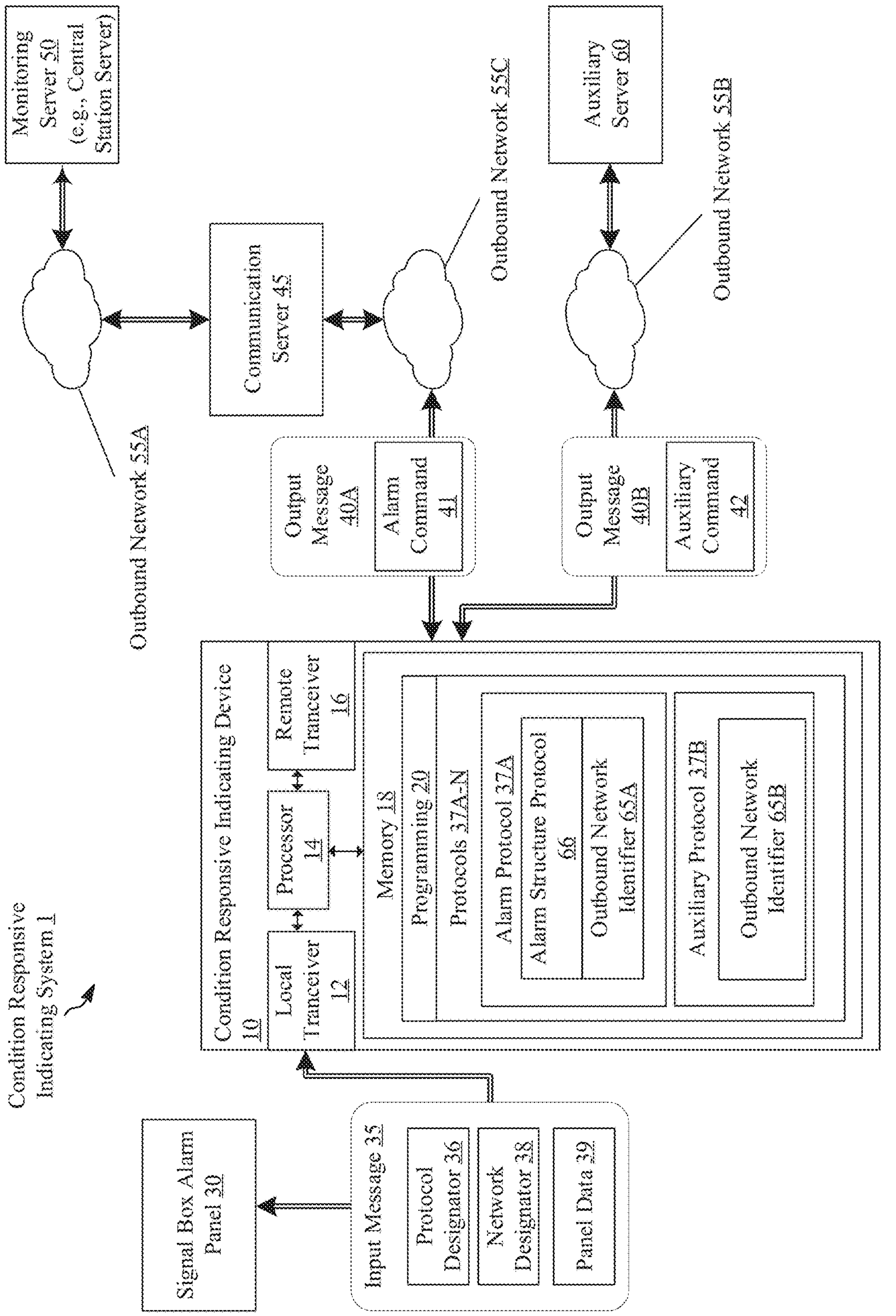
FIG. 1 is a system diagram of a condition responsive indicating system facilitating communication between a signal box alarm panel and a monitoring server or an auxiliary server.

FIG. 1 is a system diagram of an exemplary condition responsive indicating system 1 facilitating communication between a signal box alarm panel 30 and a monitoring server 50 and an auxiliary server 60.

Signal box alarm panel 30 is a largely typical alarm panel, configured to sense a previously-defined alarm condition or event and sends electronic information, such as an alert, to monitoring server 50. Signal box alarm panel 30 includes a serial transmission component such as a universal asynchronous receiver-transmitter (UART) and may include a public switched telephone network (PSTN) interface.

Monitoring server 50 is a typical computing server implementing monitoring software, capable of alerting personnel to an alarm condition or event sent as electronic information by the signal box alarm panel 30. The monitoring server 50 can include a digital receiving unit to receive electronic information. In this embodiment, monitoring server 50 is connected with a communication connection, such as a broadband connection via the digital receiving unit to an outbound network 55A.

Outbound network 55A can include, for example, network infrastructure and endpoints of cellular, optical fiber, cable, ethernet, wireless, or satellite networks, or a combination thereof. Endpoints include any device that connects to a network, as well as any port, plug, or interface that directly facilitates a connection to that network. Other types of networks, network infrastructure, and network endpoints would be understood by those skilled in the art. Outbound network 55A can also be a dedicated network for transmitting electronic information regarding alarm conditions and events. Outbound network 55A can share infrastructure and be directly in connection with outbound networks 55B-C, or all outbound networks 55A-C can be different, disconnected networks in both type or instance. For example, outbound network 55A can be a network with PSTN endpoints and PSTN communication protocols, outbound network 55B can be a WAN including ethernet endpoints such as the internet, and outbound network 55C can be a dedicated LTE network with cellular endpoints and internet protocols. If one or more outbound networks 55A-C are the same network (e.g., outbound networks 55A-C are all the internet) virtual networks may be understood to exist, meaning that network traffic from outbound network 55C may be invisible to and unable to interact with or effect network traffic from outbound network 55B.

Signal box alarm panel 30 in this example is not configured to connect to any of the outbound networks 55A-C, and so signal box alarm panel 30 interfaces with outbound networks 55A-C via a condition responsive indicating device 10 to contact monitoring server 50 or an auxiliary server 60.

Condition responsive indicating device 10 includes a processor 14. Although processor 14 may be configured by use of hardwired logic, typical processors are general or dedicated processing circuits configured by execution of programming. Processor 14 includes elements structured and arranged to perform one or more processing functions, typically various data processing functions. Although discrete logic components could be used, the examples utilize components forming a programmable CPU. Processor 14 for example includes one or more integrated circuit (IC) chips incorporating the electronic elements to perform the functions of the CPU. Processor 14 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware. Although the illustrated examples of processor 14 includes only one microprocessor, for convenience, a multi-processor architecture can also be used. A digital signal processor (DSP) or field-programmable gate array (FPGA) could be suitable replacements for processor 14 but may consume more power with added complexity.

Condition responsive indicating device 10 includes a local transceiver 12, coupled to processor 14. Local transceiver 12 is configured to receive electronic information from signal box alarm panel 30. The electronic information received is in the format of an input message 35, which contains as panel data 39 any alarm codes, additional event information, diagnostic or maintenance information, or any other information signal box alarm panel 30 is configured to transmit via one or more of outbound networks 55A-C. To facilitate that transfer via the one or more outbound networks 55A-C, input message 35 may include a protocol designator 36, which is a reference to a specific protocol 37A-N: in this example either alarm protocol 37A, or auxiliary protocol 37B. The protocol designator 36 therefore indicates which protocol or protocols are acceptable to utilize in order to transmit input message 35. Protocols 37A-N include in part the messaging protocol, which facilitate transferring the panel data 39 over the correct outbound networks 55A-C and to and through the appropriate servers 45, 50, 60. Some example messaging protocols for outbound network 55A include the Internet Protocol (IP) or PSTN, for outbound network 55B IP, and for outbound network 55C IP or and short message service (SMS). Alarm protocol 37A also includes an alarm structure protocol 66, which indicates the type and structure of the alarm codes in panel data 39. Some examples of alarm structure protocols 66 include Contact ID, pulse, or SIA. Input message 35 may also include a network designator 38, indicating which outbound network 55C or outbound network 55B are acceptable to utilize in order to transmit input message 35. The network designator 38 will match with an outbound network identifier 65A-B, which identifies which outbound network 55B-C is an appropriate network for the given panel data 39 of the associated input message 35. Example networks can include network infrastructure and endpoints of cellular, optical fiber, cable, ethernet, wireless, or satellite networks, or a combination thereof, and example networks can require usage of network protocols such as the IP, PSTN, or SMS protocols as appropriate.

Though input message 35 may include protocol designator 36 or network designator 38, input message 35 in this example is sent in a format incongruent with outbound networks 55A-C. Signal box alarm panel 30 communicates a binary message using a Universal Asynchronous Receiver Transmitter (UART): signal box alarm panel 30 is wired into local transceiver 12 of condition responsive indicating device 10, and transmits input message 35 binary data according to a standard such as Recommended Standard 232 (RS-232) to local transceiver 12. Once condition responsive indicating device 10 receives input message 35, processor 14 interfaces with memory 18 in order to understand input message 35, and properly route the panel data 39 of input message 35 as an output message 40A-B via a remote transceiver 16.

Memory 18 is for storing data and programming. In the example, memory 18 may include a flash memory (non-volatile or persistent storage) and/or a random-access memory (RAM) (volatile storage). The RAM serves as short term storage for instructions and data being handled by the processor 14 e.g., as a working data processing memory. The flash memory typically provides longer term storage. Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Remote transceiver 16 is for receiving and transmitting various messages, including output messages 40A-B. Remote transceiver 16 allows for data communication (e.g., wired or wireless) over various networks, including outbound networks 55B-C. Remote transceiver 16 can include a radio frequency (RF) transceiver, configured to communicate over cellular, Wi-Fi, Bluetooth™, or Ethernet networks, endpoints, and protocols, as examples. In some examples the remote transceiver 16 can facilitate the receiving and transmission of messages over two interfaces: a Local Area Network (LAN) interface for Ethernet, Wi-Fi, or Bluetooth communications, and a Wide Area Network (WAN) interface for cellular, RF, or satellite communications.

Memory 18 contains programming 20, which configures condition responsive indicating device 10 to utilize local transceiver 12 and remote transceiver 16 to facilitate transmitting the panel data 39 of the input message 35 from signal box alarm panel 30 to monitoring server 50 or auxiliary server 60. To further facilitate the transmission of messages, memory 18 also includes a plurality of protocols 37A-N. Messaging protocols 37A-N allow for condition responsive indicating device 10 to send output messages 40A-B in a variety of formats, based upon the needs of signal box alarm panel 30. In some implementations, protocol 37A directs output message 40A in an alarm format to monitoring server 50, while protocols 37B-N can include protocols to send output messages 40B in a variety of communication means as appropriate, based upon the requirements of auxiliary server 60. For example, monitoring server 50 may transmit an acknowledgement message or code, to confirm that input message 35 from signal box alarm panel 30 was received as output message 40A. Monitoring server 50 may not have information related to the connection between condition responsive indicating device 10 and signal box alarm panel 30, and therefore condition responsive indicating device 10, using a select protocol of protocols 37A-N, can correctly format toward a communication means as appropriate an incoming message from monitoring server 50 as a communication means understandable by signal box alarm panel 30 as received from local transceiver 12.

Protocols 37A-N not only include message formats, but also appropriate signals, handshakes, confirmations, keys, encryption tools, and logging requirements to conform with the network requirements of any outbound networks 55A-C requirements, as well as similar requirements of recipient servers 45, 50, 60.

Protocols 37A-N include at least two protocols: an alarm protocol 37A and an auxiliary protocol 37B. Alarm protocol 37A takes panel data 39 of input message 35, formats panel data 39 towards a communication means appropriate as needed to form an alarm command 41, and prepares alarm command 41 for transmission to monitoring server 50 via communication server 45 as output message 40A. In some examples, monitoring server 50 will be expecting a Contact ID code representing the event detected by signal box alarm panel 30. If panel data 39 of input message 35 as received at condition responsive indicating device 10 are in the form of a Contact ID code, then no reformatting is required.

Once panel data 39 of input message 35 are in an appropriate format as alarm command 41, alarm protocol 37A also includes information for structuring output message 40A. Outbound network 55C may be a WAN or LAN network, implementing an IP-based or packet-switched protocol or a cellular-based network utilizing SMS messaging. Alarm protocol 37A indicates to condition responsive indicating device 10 to package or wrap alarm command 41 in output message 40A as opposed to output message 40B.

In an exemplary embodiment, output message 40A will make an intermediary stop after leaving remote transceiver 16, but before reaching monitoring server 50. That intermediary stop will be at a communication server 45, which in some implementations is known as a Telguard™ Communication Center. Communication server 45 is capable of aggregating or formatting towards a communication means appropriate as understood by a person of ordinary skill in the art alarm command 41 and output message 40A, as needed. In some examples, monitoring server 50 may expect alarm command 41 to be transmitted by IP or a PSTN protocol. In some implementations, as signal box alarm panel 30 or condition responsive indicating device 10 may not have information related to the specific type of monitoring server 50 output message 40A will be sent to, input message 35 panel data 39 may be in another format: for example, the SIA code format, or some kind of unstructured data, such as a JavaScript Object Notation (JSON) blob. In such examples, the communication server 45 could format the panel data 39 of input message 35 towards an appropriate communication means e.g., a Contact ID code.

The outbound network 55C is an IP-based network, such as the internet. Example monitoring server 50 has no access to the internet outbound network 55C, only access to outbound network 55A, which is not connected to signal box alarm panel 30, or condition responsive indicating device 10. In this example, monitoring server 50 is isolated both by network as well as by protocol. In this example, communication server 45 will act as an intermediary: connected both to internet-based outbound network 55C as well as the PSTN-based outbound network 55A. As output message 40A is sent from remote transceiver 16 as an IP-based message, communication server 45 will receive output message 40A, and reformat as a PSTN-based message. Then, output message 40A, as a PSTN-based message, will be sent to monitoring server 50.

Auxiliary protocol 37B is a protocol allowing signal box alarm panel 30 to send and receive data to and from an auxiliary server 60, in particular the panel data 39. The data may include alarm information, or the data may not include alarm information. In some examples, signal box alarm panel 30 is configured to transmit additional information related to an alarm event: information which cannot be captured in alarm command 41. For example, alarm command 41 may indicate that a fire is detected. However, signal box alarm panel 30 may collect additional information, such as the temperature of the fire and locations within the premises of the fire itself. Signal box alarm panel 30 may even possess a floorplan of the premises, which can be transmitted during an alarm event to assist first responders, or insurance auditors, in their tasks regarding the event. The data may also be non-event related: signal box alarm panel 30 may be configured to report security camera data to a secure database at auxiliary server 60, or may be coupled to smart home or smart facilities management software, which can utilize the data captured by signal box alarm panel 30 to facilitate efficient management of the premises.

As the structure of this auxiliary data is less defined than a Contact ID as provided in alarm command 41, the auxiliary data requires a separate auxiliary protocol 37B to prepare and direct the auxiliary data. First, if the auxiliary data from input message 35 requires formatting towards an appropriate communication means, auxiliary protocol 37B will be utilized to restructure the data into an auxiliary command 42, for consumption by auxiliary server 60. formatting towards an appropriate communication means can include reading the data frame of the local transceiver 12 as the local transceiver 12 receives signals, buffering the frame data from the data frame into a byte array in memory 18, and concatenating the buffered byte array data into a multi-byte array stored in memory 18 representing the panel data 39. In some examples, however, signal box alarm panel 30 and auxiliary server 60 are particularly configured to communicate with one another: in those examples, condition responsive indicating device 10 will pass through the data from input message 35 as auxiliary command 42, and will not perform any data restructuring. Next, auxiliary command 42 is wrapped or packaged for communication over outbound network 55B. In this example, outbound network 55C and outbound network 55B are depicted as separate networks; however, both networks could in fact be the same network e.g., the internet. However, even if both networks 55B-C are the same network, they may be traversed differently: alarm command 41 may be sent over an IP-based cellular connection to the network, as the cellular connection may be more reliable than the ethernet of the premises. A cellular connection may be used because it is a WAN connection, thereby requiring less local traversal, and exposing the messaging pipeline to less risk of any individual network participant not properly transmitting messages. However, if cellular is viewed as being relatively expensive to utilize, auxiliary command 42 may be sent over LAN to auxiliary server 60. Alternatively, the condition responsive indicating device 10 may choose an initial path, and only utilize another path in failover circumstances.

In another embodiment, there may be multiple monitoring servers 50, multiple communication servers 45, and multiple auxiliary servers 60, each utilizing various outbound networks 55A-C and protocols 37A-N. Condition responsive indicating device 10 is configured to route output messages 40A-B appropriately, using the proper protocol 37A-N over the proper outbound network 55A-C In particular with auxiliary command 42, condition responsive indicating device 10 is acting as a forwarding component in the messaging chain: signal box alarm panel 30 may be configured with the IP address or URL of auxiliary server 60, and if so configured signal box alarm panel 30 will provide that information to condition responsive indicating device 10. Condition responsive indicating device 10 will use that information to send auxiliary command 42 packaged within output message 40B to the IP address or URL provided by signal box alarm panel 30. For both alarm command 41 and auxiliary command 42, signal box alarm panel 30 may be configured with both the target endpoint (e.g., the particular ports of monitoring server 50 or auxiliary server 60), the protocol to utilize (sent as protocol designator 36) and the network to use (sent as network designator 38). If provided these instructions, condition responsive indicating device 10 can honor those instructions, and send alarm command 41 or auxiliary command 42 exactly as instructed. Condition responsive indicating device 10 can return an error if the instructions cannot be followed (e.g., outbound network 55C is unreachable). Condition responsive indicating device 10 can also fill in unspecified instructions from signal box alarm panel 30 with default assumptions, such as the IP address of communication server 45.

Therefore, FIG. 1 depicts a condition responsive indicating device 10, comprising a local transceiver 12, configured to communicate with a signal box alarm panel 30, and a processor 14, coupled to the local transceiver 12. The condition responsive indicating device 10 also comprises a remote transceiver 16, coupled to the processor 14 and configured to connect to at least one network 55B-C as well as a memory 18, coupled to the processor 14. The condition responsive indicating device 10 further comprises programming 20 in the memory 18, wherein execution of the programming by the processor 14 configures the condition responsive indicating device 10 to implement the following functions. First, the condition responsive indicating device 10 receives an input message 35 via the local transceiver 12, the input message 35 including a protocol designator 36. Second, the condition responsive indicating device 10 selects a protocol 37A based on the protocol designator 36 of the input message 35. Third, the condition responsive indicating device 10 transmits an output message 40A via the remote transceiver 16, over at least one outbound network 55C from the at least one network 55B-C, utilizing the selected protocol 37A. The protocol 37A can be selected from a plurality of protocols 37A-N, and the plurality of protocols 37A-N includes an alarm protocol 37A and an auxiliary protocol 37B. The at least one network 55B-C can include a local area network, or a wide area network.

The alarm protocol 37A can direct the output message 40A to a monitoring server 50. The output message 40A directed to the monitoring server 50 can be received by an intermediary communication server 45, and the communication server 45 directs the output message 40A to the monitoring server 50. An alarm command 41 within the output message can include panel data 39 of the input message 35. The output message 40A can be transmitted within an alarm command sequence comprising one or more alarm command coordinating messages, as further described in FIG. 3A.

The auxiliary protocol 37B can direct the output message 40B to an auxiliary server 60. An auxiliary command 42 within the output message 40B can be unaltered panel data 39 of the input message 35. The output message 40B can be transmitted within an auxiliary command sequence comprising one or more auxiliary command coordinating messages, as further described in FIG. 3B.

FIG. 1 also depicts a condition responsive indicating system 1 comprising a signal box alarm panel 30 and a condition responsive indicating device 10, coupled to the signal box alarm panel 30. The condition responsive indication device 10 comprises a local transceiver 12 configured to communicate with a signal box alarm panel 30, a processor 14 coupled to the local transceiver 12, a remote transceiver 16 coupled to the processor 14, and a memory 18 coupled to the processor 14. The condition responsive indicating system 1 also comprises a communication server 45 coupled to the condition responsive indicating device 10 via the remote transceiver 16, a monitoring server 50 remote from and coupled to the communication server 45, and an auxiliary server 60, remote from and coupled to the condition responsive indicating device 10 via the remote transceiver 16. The signal box alarm panel 30 determines a condition has been satisfied. In response to the determination, the signal box alarm panel 30 transmits an alarm command 41 to the condition responsive indicating device 10. The alarm command 41 may be in the form or content of panel data 39. In response to receiving the transmission, the condition responsive indicating device 10 transmits the alarm command 41 to the communication server 45. The communication server 45 transmits the alarm command 41 to the monitoring server 50 packaged according to the IP protocol or a public switched telephone network (PSTN) protocol 37A-N. The signal box alarm panel 30 transmits an auxiliary command 42 to the condition responsive indicating device 10. The auxiliary command 42 may be in the form or content of panel data 39. The condition responsive indicating device 10 transmits the auxiliary command 42 to the auxiliary server 60 according to the IP protocol 37A-N.

The condition responsive indicating device 10 can transmit the alarm command 41 to the communication server 45 packaged within a short message service (SMS) protocol 37A-N, or within an internet protocol (IP) protocol 37A-N, over a local area network 55C or a cellular network 55C. The condition responsive indicating device 10 can transmit the auxiliary command 42 to the auxiliary server 60 formatted within an internet protocol (IP) 37A-N communication means, over a local area network 55B or a wide area network 55B.

FIG. 1 further depicts a condition responsive indicating system 1, comprising a signal box alarm panel 30 and a monitoring server 50 configured to receive communications over a packet-switched or circuit-switched communication means 55A. The condition responsive indicating system 1 is configured to transmit a message 40A from the signal box alarm panel 30 to the monitoring server 50. The signal box alarm panel 30 can be configured to transmit communications over a serial connection communication means. This embodiment of a condition responsive indicating system 1 would be a system that allows all alarm panel data to be communicated to key stakeholders including but not limited to Central Stations with standardized equipment.

The condition responsive indicating system 1 can further comprise a condition responsive indicating device 10, coupled to the signal box alarm panel 30, where the monitoring server 50 is coupled to the condition responsive indicating device 10, the signal box alarm panel 30 is configured to transmit an alarm command 41 to the condition responsive indicating device 10, and the condition responsive indicating device 10 is configured to transmit the alarm command 41 to the monitoring server 50 via a public-switched telephone network protocol 37A-N or an internet protocol 37A-N. The alarm command 41 may be in the form or content of panel data 39. This embodiment of a condition responsive indicating system 1 would be a system that allows delivery of alarm data in conventional protocols using PSTN or IP pathways to standard Central Station equipment, without custom hardware or software.

The condition responsive indicating system 1 can further comprise a condition responsive indicating device 10, coupled to the signal box alarm panel 30, where the signal box alarm panel 30 is configured to select an outbound network 55B-C from at least one network 55B-C. The condition responsive indicating device 10 can be configured to transmit an outbound message 40A-B over the outbound network 55B-C, and the at least one network 55B-C includes a direct connection to a local area network 55B-C and a direct connection to a wide area network 55B-C. This embodiment of a condition responsive indicating system 1 would be a system that allows the signal box alarm panel 30 to choose the best transmission path out of a premises: internet, cellular, or best available path.

The condition responsive indicating device 10 of the condition responsive indicating system 1 can be configured to receive an input message 35 from the signal box alarm panel 30, transmit panel data 39 of the input message 35 to the monitoring server 50, and transmit the panel data 39 of the input message 35 to an auxiliary server 60. This embodiment of a condition responsive indicating device 10 would be an interface that provides the alarm panel a means for data, not limited to alarm data in conventional protocols, to be sent to non-central station endpoints.

The condition responsive indicating device 10 of the condition responsive indicating system 1 can be configured to receive an input message 35 from the signal box alarm panel 30, receive a network designator 38 from the signal box alarm panel 30, and transmit the input message 35 via a transmission network 55B corresponding to an outbound network identifier 65B to an auxiliary server 60. This embodiment of a condition responsive indicating device 10 would be an interface that provides the alarm panel a means for non-alarm or unconventional data, including data that is not covered within standard protocols but alarm panels may choose to deliver to a service different than a Central Monitoring Station, to be delivered to custom endpoints over IP, such as cellular or LAN-based, as determined by the alarm panel.

The condition responsive indicating device 10 of the condition responsive indicating system 1 can be configured to transmit an auxiliary data command 42 to an auxiliary server 60, receive a responsive auxiliary data command 42 from the auxiliary server 60, and transmit the responsive auxiliary data command 42 to the signal box alarm panel 30. This embodiment of a condition responsive indicating device 10 would be an interface which provides the alarm panel a means to initiate data transactions, such as uploads or downloads, with chosen endpoints, data transactions that go beyond alarm panel data, such as firmware updates, configuration changes, etc.

Figure 2:
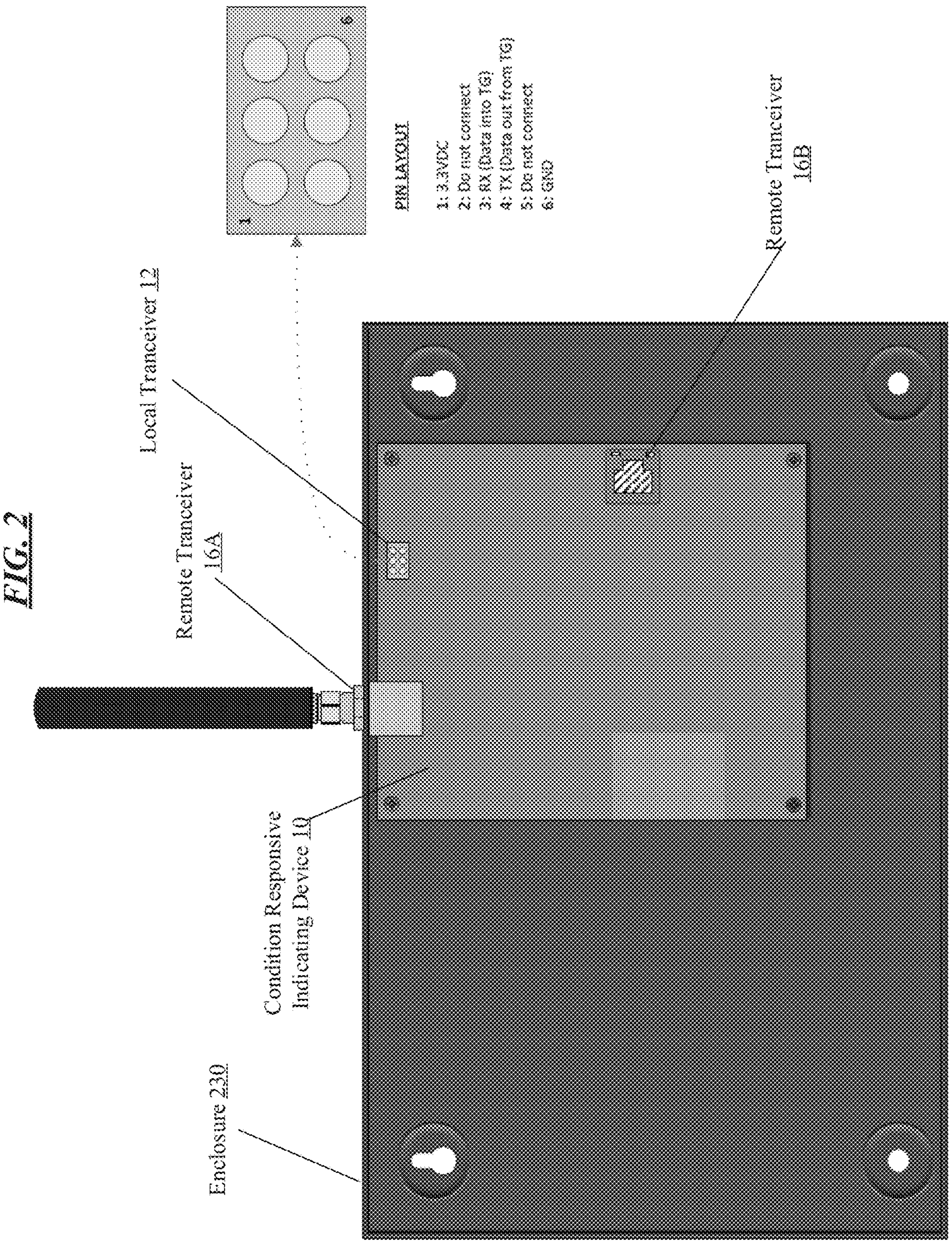
FIG. 2 is a depiction of an exemplary condition responsive indicating device.

FIG. 2 is a depiction of an exemplary condition responsive indicating device 10. Signal box alarm panel 30 may connect to the condition responsive indicating device 10 in any typical manner by which signals may be transmitted. In this particular example, condition responsive indicating device 10 has an exemplary local transceiver 12 designed to connect to signal box alarm panel 30 via a pin-based UART connection. Pins three and four of the local transceiver are wired into signal box alarm panel 30, and pin six is wired to ground, allowing for duplex communication. Remote transceiver 16 of the condition responsive indicating device 10 in this example includes two sub-components: a cellular antenna remote transceiver 16A, and an Ethernet plug remote transceiver 16B. The condition responsive indicating device 10 utilizes remote transceivers 16A-B to connect to one or more outbound networks 55A-C. Condition responsive indicating device 10 may be placed within an enclosure 230. Enclosure 230 can protect condition responsive indicating device 10 from environmental risks, and enclosure 230 may be rated for heat resistance up to or exceeding fire code specifications where condition responsive indicating device 10 is installed. Enclosure 230 may also be designed to protect against impact or vandalism. Enclosure 230 may not be certified for any protective role enclosure 230 may fill. Enclosure 230 may be a third-party enclosure, such as an electrical panel including electrical equipment or signal box alarm panel 30 connected to condition responsive indicating device 10. In some examples, enclosure 230 may be omitted.

Figure 3A:
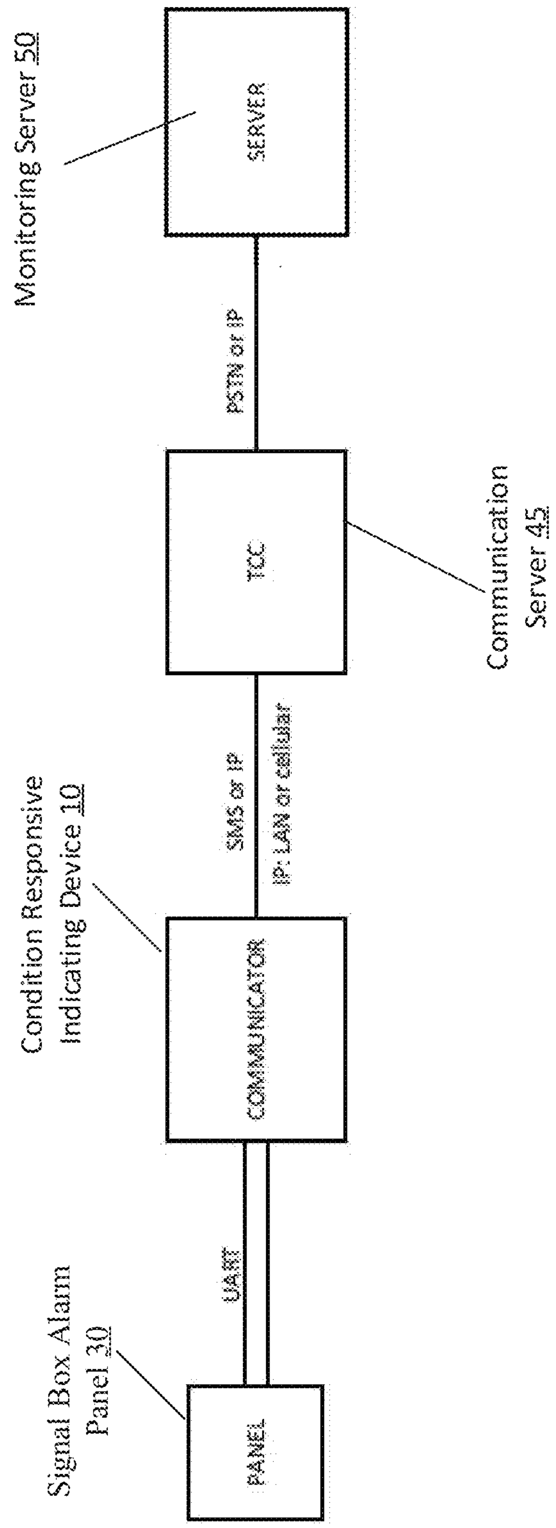
FIG. 3A is a network diagram illustrating connections between a signal box alarm panel and a monitoring server, via a condition responsive indicating device and a communication server, for the purpose of transmitting alarm data.

FIG. 3A is a network diagram illustrating connections between a signal box alarm panel 30 and a monitoring server 50, via a condition responsive indicating device 10 and a communication server 45, for the purpose of transmitting alarm data. Signal box alarm panel 30 issues a session begin command to condition responsive indicating device 10 via a UART connection. The session begin command can be in response to a preconfigured condition being satisfied, such as the detection of a fire by the signal box alarm panel 30 or a sensor coupled to the signal box alarm panel 30. The session begin command can include protocol designator 36, indicating that alarm command 41 will be transmitted. Condition responsive indicating device 10 acknowledges the session begin command, and confirms connectivity to communication server 45. In this example, to confirm connectivity, condition responsive indicating device 10 transmits a link request to communication server 45 over SMS or IP: if IP is used, the IP could be over a network with LAN or WAN (including cellular) infrastructure and endpoints. Communication server 45 receives the link request, and transmits an acknowledgement to condition responsive indicating device 10. Condition responsive indicating device 10 receives the acknowledgement, and sets a handshake condition. Signal box alarm panel 30 issues a status command seeking the handshake condition from condition responsive indicating device 10. Signal box alarm panel 30 then reads the handshake condition, and issues an alarm data command. Condition responsive indicating device 10 receives the alarm data command, stores the alarm data command in memory 18, and acknowledges the alarm data command to signal box alarm panel 30. Signal box alarm panel 30 receives the acknowledgement, and issues any alarm data command for another event. This issuance, reception, storage, acknowledgement, reception cycle repeats until Signal box alarm panel 30 has delivered all alarm data commands. Once all alarm data commands have been delivered from signal box alarm panel 30 to condition responsive indicating device 10, signal box alarm panel 30 issues a session end command to the condition responsive indicating device 10.

Once condition responsive indicating device 10 receives the session end command, condition responsive indicating device 10 acknowledges the session end command to signal box alarm panel 30, and transmits an alarm data report (containing the alarm data commands as alarm commands 41) to communication server 45. Communication server 45 receives the alarm data report, and transmits an acknowledgement to condition responsive indicating device 10. Communication server 45 then processes schedule, and connects to monitoring server 50 via a PSTN or IP connection. Monitoring server 50 receives the connection request, and sends a handshake signal to communication server 45. Communication server 45 receives the handshake signal, and delivers the alarm data report to monitoring server 50. Monitoring server 50 receives the alarm data report, and then sends an alarm acknowledgement signal to communication server 45 to send more alarm data or end the call.

Alternatively, in some circumstances, the communication server will process schedule, and directly connect to the monitoring server 50, sending the connection request, receiving the handshake signal, delivering the alarm data report directly to the monitoring server 50, and receiving the alarm acknowledgement signal.

Once communication server 45 receives the alarm acknowledgement signal, communication server 45 sends the next alarm data report, which repeats the message chain to monitoring server 50. Once communication server 45 has sent all alarm data and received confirmatory alarm acknowledgement signals for that alarm data, communication server 45 disconnects.

The series of signals and messages described in FIG. 3A may also be understood as an alarm command sequence, broadly facilitating, securing, and confirming the communication of alarm commands 41 from signal box alarm panel 30 to monitoring server 50. The session begin command, link request, status command, session end command, alarm data report, acknowledgement, handshake signal, and alarm acknowledgement signal may be understood as alarm command coordinating messages of an alarm command sequence, facilitating the transfer of the panel data 39 from the signal box alarm panel 30 to the monitoring server 50.

Figure 3B:
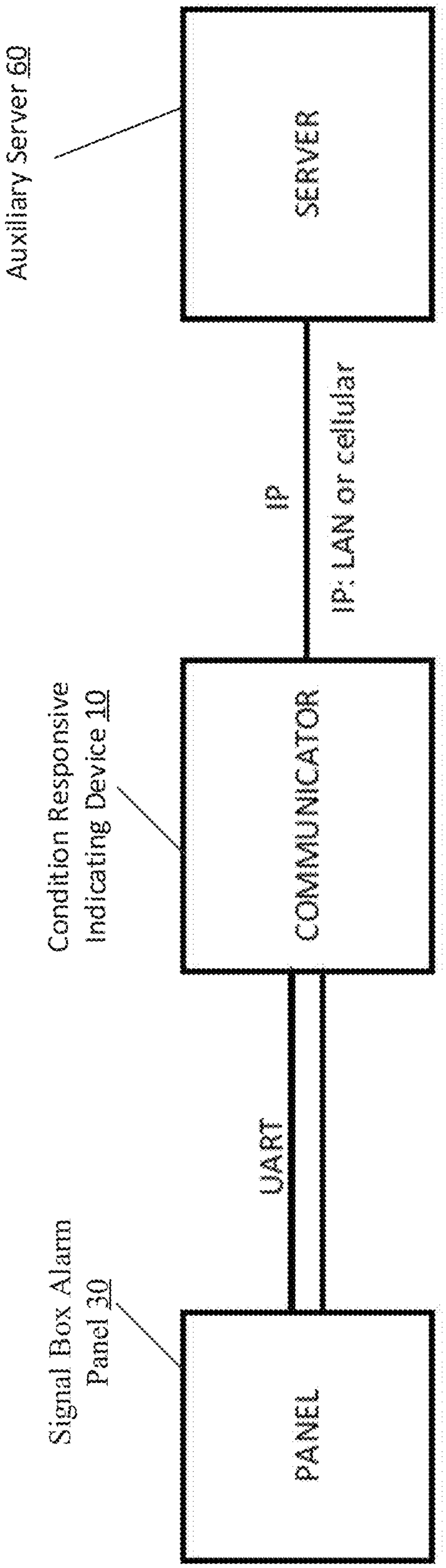
FIG. 3B is a network diagram illustrating connections between a signal box alarm panel and an auxiliary server, via a condition responsive indicating device, for the purpose of transmitting non-alarm, auxiliary data.

FIG. 3B is a network diagram illustrating connections between a signal box alarm panel 30 and an auxiliary server 60, via a condition responsive indicating device 10, for the purpose of transmitting non-alarm, auxiliary data. Signal box alarm panel 30 issues a connect command to condition responsive indicating device 10 over a UART connection to facilitate a connection to auxiliary server 60. The connect command can include protocol designator 36 and network designator 38, together indicating that auxiliary command 42 will be transmitted particularly to auxiliary server 60. Condition responsive indicating device 10 acknowledges that connect command, and attempts to open a connection to auxiliary server 60 over an IP-based network utilizing a LAN or WAN (including cellular), infrastructure and endpoints. Auxiliary server 60 receives the attempt, and accepts the connection from condition responsive indicating device 10. Condition responsive indicating device 10 detects the connection to auxiliary server 60, and sets a connection condition. Signal box alarm panel 30 issues a status command seeking the connection condition from condition responsive indicating device 10. Signal box alarm panel 30 then reads the connection condition, and issues an auxiliary data command including panel data 39. Condition responsive indicating device 10 acknowledges the auxiliary data command to signal box alarm panel 30, and sends the auxiliary data command including panel data 39 to auxiliary server 60.

Auxiliary server 60 receives the auxiliary data command with panel data 39, and then sends a responsive auxiliary data command for signal box alarm panel 30 to condition responsive indicating device 10. The responsive auxiliary data command could be substantive data, or the responsive auxiliary data command could be an acknowledgement. Condition responsive indicating device 10 receives the responsive auxiliary data, and stores the responsive auxiliary data within memory 18. Signal box alarm panel 30 issues a status command seeking the responsive auxiliary data from condition responsive indicating device 10. Signal box alarm panel 30 then detects and reads the responsive auxiliary data.

The messaging loop from signal box alarm panel 30 through condition responsive indicating device 10 to auxiliary server 60, and then back to signal box alarm panel 30 via condition responsive indicating device 10 repeats until both signal box alarm panel 30 and auxiliary server 60 have no further data commands to transmit between one another. At that point, signal box alarm panel 30 issues a disconnect command to condition responsive indicating device 10. Condition responsive indicating device 10 acknowledges the disconnect command, and disconnects from auxiliary server 60. Auxiliary server 60, detecting the disconnect, itself also disconnects from condition responsive indicating device 10.

The series of signals and messages described in FIG. 3B may also be understood as an auxiliary command sequence, broadly facilitating, securing, and confirming the communication of auxiliary commands 42 from signal box alarm panel 30 to auxiliary server 60. The connect command, status command, responsive auxiliary data command, disconnect command may be understood as auxiliary data command coordinating messages of an auxiliary command sequence, facilitating the transfer of the panel data 39 from the signal box alarm panel 30 to the auxiliary server 60.

It is to be understood that the operational steps are performed by condition responsive indicating device 10 upon loading and executing software code or instructions which are tangibly stored on a tangible computer readable medium, such as a magnetic medium, e.g., a computer hard drive, an optical medium, e.g., an optical disc, solid-state memory, e.g., flash memory, or other storage media known in the art. Thus, any of the functionality performed by the condition responsive indicating device 10 described herein is implemented in software code or instructions which are tangibly stored on a tangible computer readable medium. Upon loading and executing such software code or instructions by condition responsive indicating device 10, condition responsive indicating device 10 or condition responsive indicating system 1 may perform any of the functionality of condition responsive indicating device 10 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The term "coupled" as used herein refers to any logical, optical, RF, physical, or electrical connection, link, or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed is:

1. A condition responsive indicating device, comprising:
- a local transceiver, configured to communicate with a signal box alarm panel;
- a processor, coupled to the local transceiver;
- a remote transceiver, coupled to the processor, and configured to connect to at least one network;
- a memory, coupled to the processor; and
- programming in the memory, wherein execution of the programming by the processor configures the condition responsive indicating device to implement functions, including functions to:
  - (i) receive an input message via the local transceiver, the input message including a protocol designator indicating at least one protocol for transmitting the input message;
  - (ii) select a protocol based on the protocol designator of the input message; and
  - (iii) transmit an output message via the remote transceiver, over at least one outbound network from the at least one network, utilizing the selected protocol.

2. The condition responsive indicating device of claim 1, wherein the protocol is selected from a plurality of protocols, and the plurality of protocols includes:
- a) an alarm protocol, and
- b) an auxiliary protocol.

3. The condition responsive indicating device of claim 2, wherein the alarm protocol directs the output message to a monitoring server.

4. The condition responsive indicating device of claim 3, wherein the output message is transmitted within an alarm command sequence comprising one or more alarm command coordinating messages.

5. The condition responsive indicating device of claim 3, wherein the output message directed to the monitoring server is received by an intermediary communication server, and the communication server directs the output message to the monitoring server.

6. The condition responsive indicating device of claim 3, wherein an alarm command within the output message includes panel data of the input message.

7. The condition responsive indicating device of claim 2, wherein the auxiliary protocol directs the output message to an auxiliary server.

8. The condition responsive indicating device of claim 7, wherein the output message is transmitted within an auxiliary command sequence comprising one or more auxiliary command coordinating messages.

9. The condition responsive indicating device of claim 7, wherein an auxiliary command within the output message is unaltered panel data of the input message.

10. The condition responsive indicating device of claim 1, wherein the at least one network includes:

a) a local area network, or b) a wide area network.

11. A condition responsive indicating system, comprising:

a signal box alarm panel;

a condition responsive indicating device, coupled to the signal box alarm panel, the condition responsive indication device comprising:

a local transceiver, configured to communicate with a signal box alarm panel, a processor, coupled to the local transceiver, a remote transceiver, coupled to the processor, and a memory, coupled to the processor;

a communication server, coupled to the condition responsive indicating device via the remote transceiver;

a monitoring server, remote from and coupled to the communication server; and an auxiliary server, remote from and coupled to the condition responsive indicating device via the remote transceiver;

wherein:

the signal box alarm panel determines a condition has been satisfied;

in response to the determination, the signal box alarm panel transmits an alarm command to the condition responsive indicating device;

in response to receiving the transmission, the condition responsive indicating device transmits the alarm command to the communication server;

the communication server transmits the alarm command to the monitoring server packaged according to the IP protocol or a public switched telephone network (PSTN) protocol;

the signal box alarm panel transmits an auxiliary command to the condition responsive indicating device;

the condition responsive indicating device transmits the auxiliary command to the auxiliary server according to the IP protocol.

12. The condition responsive indicating system of claim 11, wherein the condition responsive indicating device transmits the alarm command to the communication server packaged within a short message service (SMS) protocol, or within an internet protocol (IP) protocol, over a local area network or a cellular network.

13. The condition responsive indicating system of claim 11, wherein the condition responsive indicating device transmits the auxiliary command to the auxiliary server formatted within an internet protocol (IP) communication means, over a local area network or a wide area network.

14. A condition responsive indicating system, comprising:

a signal box alarm panel; and a monitoring server configured to receive communications over a packet-switched or circuit-switch communication means;

wherein the condition responsive indicating system is configured to transmit a message from the signal box alarm panel to the monitoring server.

15. The condition responsive indicating system of claim 14, wherein:

the signal box alarm panel is configured to transmit communications over a serial connection communication means.

16. The condition responsive indicating system of claim 14, further comprising:

a condition responsive indicating device, coupled to the signal box alarm panel; and wherein:

the monitoring server is coupled to the condition responsive indicating device;

the signal box alarm panel is configured to transmit an alarm command to the condition responsive indicating device; and the condition responsive indicating device is configured to transmit the alarm command to the monitoring server via a public-switched telephone network protocol or an internet protocol.

17. The condition responsive indicating system of claim 14, further comprising:

a condition responsive indicating device, coupled to the signal box alarm panel;

wherein:

the signal box alarm panel is configured to select an outbound network from at least one network;

the condition responsive indicating device is configured to transmit an outbound message over the outbound network; and the at least one network include a direct connection to a local area network and a direct connection to a wide area network.

18. The condition responsive indicating system of claim 17, wherein the condition responsive indicating device is configured to:

receive an input message from the signal box alarm panel;

transmit panel data of the input message to the monitoring server; and transmit the panel data of the input message to an auxiliary server.

19. The condition responsive indicating system of claim 17, wherein the condition responsive indicating device is configured to:

receive an input message from the signal box alarm panel;

receive a network designator from the signal box alarm panel; and transmit the input message via a transmission network corresponding to an outbound network identifier to an auxiliary server.

20. The condition responsive indicating system of claim 17, wherein the condition responsive indicating device is configured to:

transmit an auxiliary data command to an auxiliary server;

receive a responsive auxiliary data command from the auxiliary server; and transmit the responsive auxiliary data command to the signal box alarm panel.

* * * * *